(12) United States Patent
Vella

(10) Patent No.: US 7,769,736 B2
(45) Date of Patent: Aug. 3, 2010

(54) SYSTEM AND METHOD FOR EFFICIENT ISSUANCE OF QUERIES

(75) Inventor: Shon Vella, Orem, UT (US)

(73) Assignee: Novell, Inc., Provo, UT (US)

( * ) Notice: Subject to any disclaimer, the term of this patent is extended or adjusted under 35 U.S.C. 154(b) by 328 days.

(21) Appl. No.: 11/772,513

(22) Filed: Jul. 2, 2007

(65) Prior Publication Data
US 2009/0012951 A1    Jan. 8, 2009

(51) Int. Cl.
*G06F 17/30* (2006.01)
(52) U.S. Cl. .................. 707/705; 707/713; 707/736
(58) Field of Classification Search .......... 707/713, 707/736, 999.001
See application file for complete search history.

(56) References Cited

U.S. PATENT DOCUMENTS 7,448,042 B1 * 11/2008 Engber et al. ............... 719/313

2004/0230572 A1 * 11/2004 Omoigui ........................ 707/3

\* cited by examiner

*Primary Examiner*—Khanh B Pham
*Assistant Examiner*—Johnese Johnson
(74) *Attorney, Agent, or Firm*—Haynes and Boone, LLP

(57) ABSTRACT

System and method for efficient issuance of queries, such as DirXML script queries, by a policy for a value of an attribute of an object of the target system are described. In one embodiment, the method comprises, responsive to issuance by a policy of a query for a value of a designated attribute of a designated object of a target system, checking a result cache associated with the target system to determine whether the value for the designated attribute of the designated object is stored therein; responsive to a determination that the value for the designated attribute of the designated object is stored in the result cache, returning the value stored in the result cache to the policy; and responsive to a determination that the value for the designated attribute of the designated object is not stored in the result cache, querying the target system for the value of the designated attribute of the designated object.

12 Claims, 2 Drawing Sheets

SYSTEM AND METHOD FOR EFFICIENT ISSUANCE OF QUERIES

CROSS REFERENCE

This application claims the benefit under Title 35, United States Code §119(e) of U.S. provisional patent application No. 60/918,206, filed Mar. 15, 2007, the disclosure of which is incorporated herein by reference.

BACKGROUND

DirXML Script is a scripting language for implementing policy in a Novell Identity Manager metadirectory engine. Each policy is implemented as a small program. DirXML Script provides a simple-to-use paradigm for accessing attribute values for a particular object in a data store, such as eDirectory, or a connected application. Because the access is so simple, it tends to be used in a way that causes the same attribute to be repeatedly queried from the target system during a single invocation of the policy. One result of such excessive and redundant reading of attribute data is slow synchronization performance in the metadirectory engine.

SUMMARY

One embodiment is a method for efficient issuance of queries by a policy for a value of an attribute of an object of the target system. The method comprises, responsive to issuance by a policy of a query for a value of a designated attribute of a designated object of a target system, checking a result cache associated with the target system to determine whether the value for the designated attribute of the designated object is stored therein; responsive to a determination that the value for the designated attribute of the designated object is stored in the result cache, returning the value stored in the result cache to the policy; and responsive to a determination that the value for the designated attribute of the designated object is not stored in the result cache, querying the target system for the value of the designated attribute of the designated object.

Another embodiment is a system for efficient issuance of queries by a policy for a value of an attribute of an object of the target system. The system comprises means responsive to issuance by a policy of a query for a value of a designated attribute of a designated object of a target system for checking a result cache associated with the target system to determine whether the value for the designated attribute of the designated object is stored therein; means responsive to a determination that the value for the designated attribute of the designated object is stored in the result cache for returning the value stored in the result cache to the policy; and means responsive to a determination that the value for the designated attribute of the designated object is not stored in the result cache for querying the target system for the value of the designated attribute of the designated object.

Yet another embodiment is a system for efficient issuance of queries by a policy for a value of an attribute of an object of the target system. The system comprises a result cache associated with the target system, wherein responsive to issuance by a policy of a query for a value of a designated attribute of a designated object of a target system, a determination is made whether the value for the designated attribute of the designated object is stored therein; wherein responsive to a determination that the value for the designated attribute of the designated object is stored in the result cache, the value stored in the result cache is returned to the policy; and wherein responsive to a determination that the value for the designated attribute of the designated object is not stored in the result cache, the target system is queried for the value of the designated attribute of the designated object.

DETAILED DESCRIPTION

One embodiment is a DirXML query minimization ("DQM") subsystem that solves the problem of slow synchronization performance in metadirectory, such as Novell Identity Manager, due to excessive and redundant reading of attribute data from a data store, such as eDirectory, or a connected application by a DirXML Script policy by minimizing the number of queries performed through the use of intelligent caching and prefetching of data. As a result, the performance of DirXML Script policies are improved without requiring the policy author to consider the number of queries that need to be performed in order to satisfy the logic of the policy.

Figure 1:
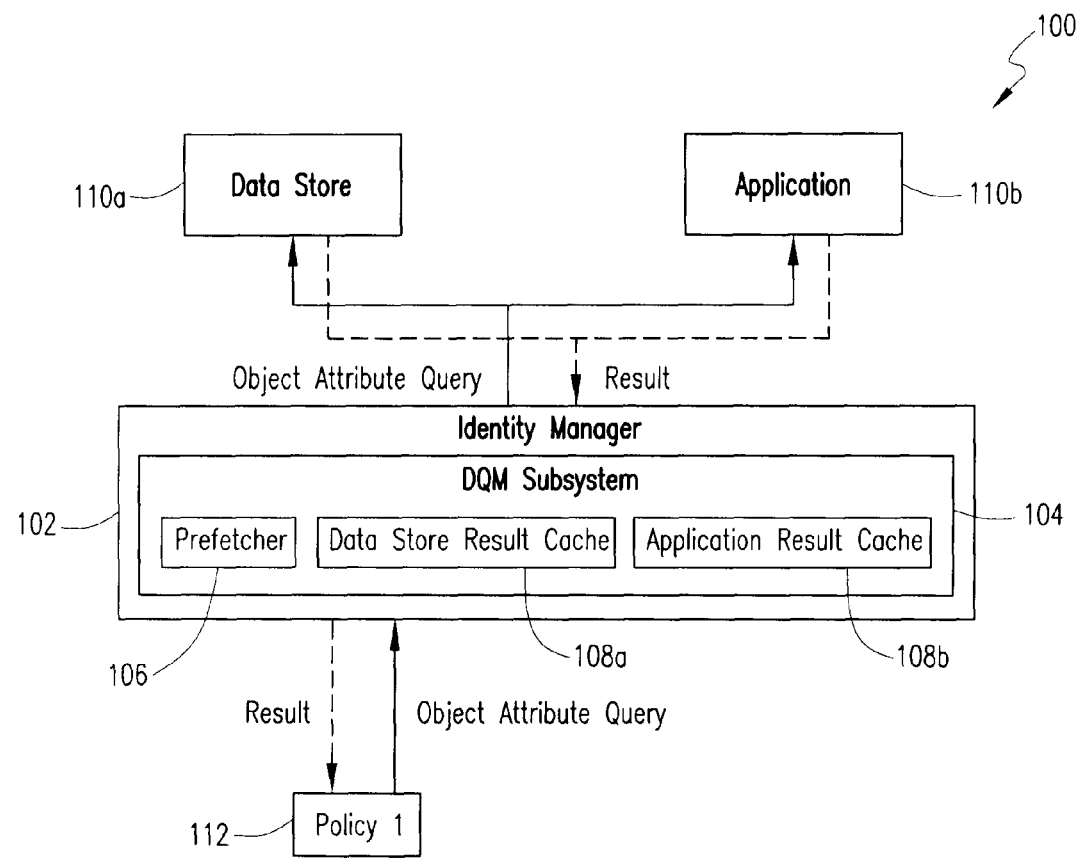
FIG. 1 is a block diagram of a system in which one embodiment of a DirXML query minimization ("DMQ") subsystem is implemented.

FIG. 1 is a block diagram of an environment 100 in which an embodiment may be implemented. As shown in FIG. 1, an otherwise conventional metadirectory, illustrated in FIG. 1 as Identity Manager 102, includes a DQM subsystem 104 for purposes that will be described in greater detail below. In one embodiment, the DQM subsystem 104 includes a prefetcher 106 and first and second result caches 108a, 108b. The first result cache 108a is associated with a data store 110a and the second result cache 108b is associated with an application 110b. It should be noted that a separate result cache should be provided for each additional data store and/or application connected to the Identity Manager 102.

In operation, as will also be described in greater detail below, whenever an object attribute query is issued by a policy 112 to the data store 110a or the application 110b, the results of the query are pushed into the corresponding result cache 108a, 108b. Each result cache 108a, 108b, is organized in a manner such that the data is easy to find. In one embodiment, query results are indexed by DN, association key, and entry ID so that results for a given object can be found regardless of the identifier used to access the attribute. Each result cache 108a, 108b, is also capable of recalling the attributes that were requested in the query so the result cache knows when a particular attribute had no values, including the case when all attributes were requested. Certain non-attribute data (such as "effective class") is also cached.

In one embodiment, each result cache 108a, 108b, is implemented using a SoftReference feature of Java2 to allow the entries thereof to be garbage-collected by the system if needed. The lifetime of each result cache 108a, 108b, is limited to a single invocation of a given policy.

In one embodiment, before a policy issues a query for a particular attribute for a specified object, it will first consult the result cache to determine whether the attribute is available from the result cache. If the attribute is available in the result cache, the query is satisfied from the result cache; otherwise, a query is issued to eDirectory or the connected application and the results are placed into the result cache.

The prefetcher functions based on previous invocations of the same policy within the lifetime of a running driver. At the end of each invocation of the policy, the result cache is analyzed and for each object class represented in the result cache, a list is constructed of the attributes for which queries were explicitly issued on that invocation of the policy. Those lists are merged with lists from previous invocations of the policy. Separate lists are maintained for eDirectory and the connected application. In future invocations of the policy, the first time an attribute is requested that is not in the result cache, the query is augmented by the prefetcher to include all attributes for that class that are "likely" to be needed in the current invocation of the policy based on previous invocations of the same policy. The results of the augmented query are then cached and can be used by the policy to fulfill subsequent attribute requests. After a few runs of a typical policy, most subsequent runs of that policy will then be able to reduce the number of queries to a single query per object to each data store.

The prefetcher augments queries based on previous invocations of the policy. One or more embodiments may be applied to other scripting languages used for policies where a facility for requesting individual attributes from a data store exists and needs to be optimized.

One embodiment is implemented using a Java2 JVM. In one embodiment, the Novell Identity Manager metadirectory system interfaces with many different external applications via a "driver shim" abstraction layer. Most deployments of the metadirectory will be used to connect to one or more third party applications.

Figure 2:
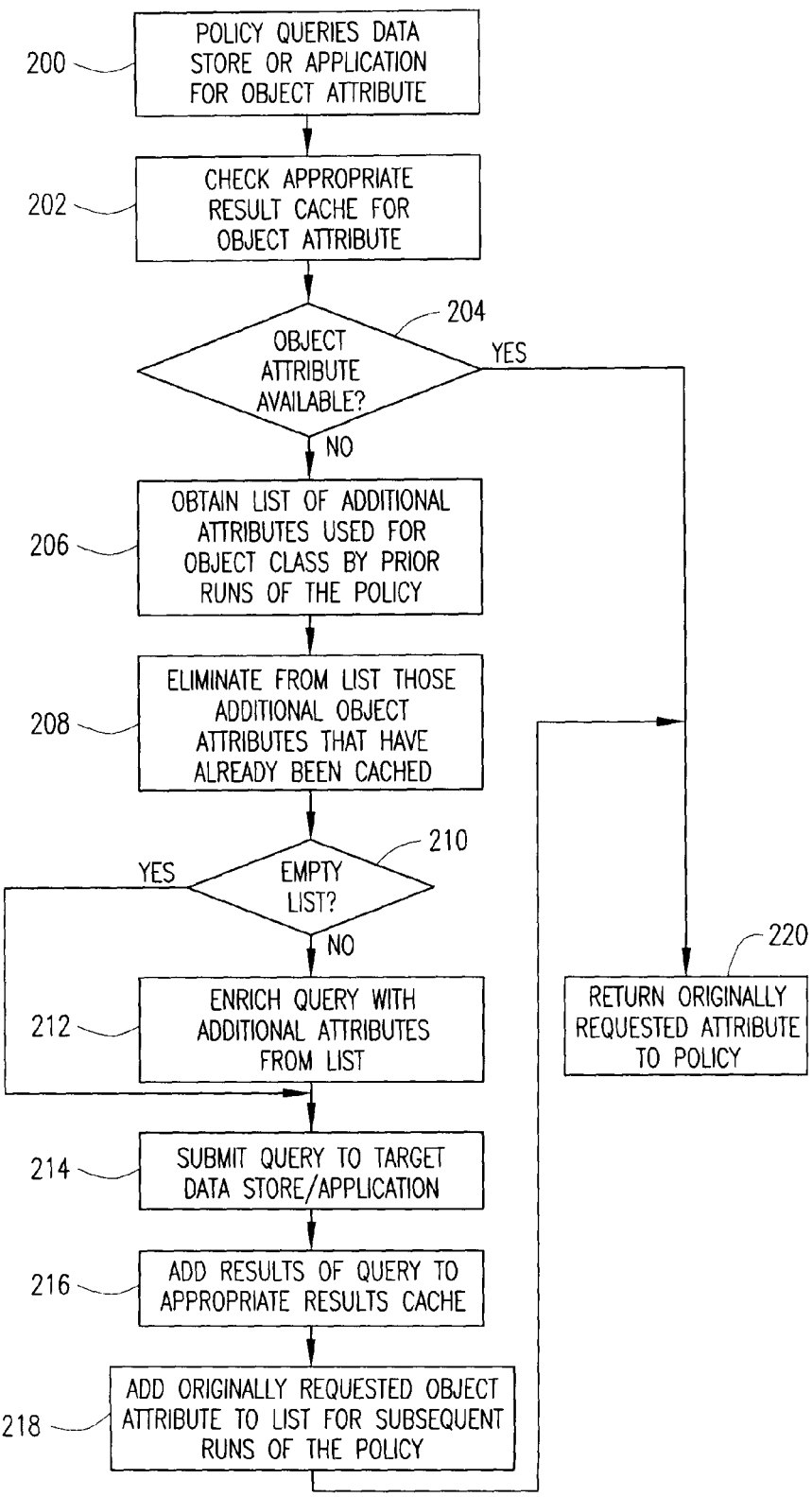
FIG. 2 illustrates one embodiment of a flowchart of the operation of an embodiment of the DMQ subsystem of FIG. 1.

FIG. 2 is a flowchart of the operation of an embodiment of the DQM subsystem. Execution of the process is initiated in response to a policy issuing a query to a target data store for an object attribute in step 200. In step 202, a result cache for the target data store is checked to determine whether the requested object attribute is available in the result cache. If the requested object attribute is not available, execution proceeds to step 206, in which a list of additional attributes used for the object class by prior runs of the same policy is obtained from the prefetcher. In step 208, all of the listed object attributes that have previously been cached for the object are eliminated from the list. In step 210, a determination is made whether the list is empty. If the list is not empty, execution proceeds to step 212, in which the query is enriched to request the additional object attributes in the list, and then to step 214, in which the query is submitted to the target data store. If a determination is made in step 210 that the list is empty, execution proceeds to directly to step 214.

In step 216, the results of the query are added to the result cache of the target data store. In step 218, the originally requested object attribute is added to the list of additional attributes for the object class for subsequent runs of the policy maintained by the prefetcher and execution proceeds to step 220, in which the originally requested attribute is returned to the requesting policy. Similarly, if in step 202 it is determined that the object attribute is available in the result cache for the target data store, execution proceeds directly to step 220.

While the preceding description shows and describes one or more embodiments, it will be understood by those skilled in the art that various changes in form and detail may be made therein without departing from the spirit and scope of the present disclosure. For example, although embodiments have been described in connection with DirXML script queries, it will be recognized that the teachings described herein may be implemented in connection with other scripting languages. Additionally, various steps of the described methods may be executed in a different order or executed sequentially, combined, further divided, replaced with alternate steps, or removed entirely. Moreover, the various steps may be initiated manually by a user or other actor or automatically in response to other steps or conditions. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for efficient issuance of queries by a policy for a value of an attribute of an object of the target system, the method comprising:

responsive to issuance by a policy of a query for a value of a designated attribute of a designated object of a target system, checking a result cache associated with the target system to determine whether the value for the designated attribute of the designated object is stored therein;

responsive to a determination that the value for the designated attribute of the designated object is stored in the result cache, returning the value stored in the result cache to the policy; and responsive to a determination that the value for the designated attribute of the designated object is not stored in the result cache, querying the target system for the value of the designated attribute of the designated object;

wherein the target system is eDirectory and the query is a DirXML script query.

2. The method of claim 1 further comprising, responsive to receipt of the value for the designated attribute of the designated object from the target system in response to the querying, storing the value in the result cache and returning the value to the policy.

3. The method of claim 1 further comprising, responsive to a determination that the value for the designated attribute of the designated object is not stored in the result cache and prior to the submitting:

obtaining a list of additional attributes for the designated object requested in previous runs of the policy; and eliminating from the list additional attributes the values of which are stored in the result cache; and querying the target system for the value of each of the additional attributes that remain on the list.

4. The method of claim 3 further comprising, subsequent to the submitting, adding the designated attribute of the designated object to the list.

5. A computer-implemented system for efficient issuance of queries by a policy for a value of an attribute of an object of the target system, the system comprising:

computer-readable media having stored therein instructions executable by the computer for causing the system to:

responsive to issuance by a policy of a query for a value of a designated attribute of a designated object of a target system, check a result cache associated with the target system to determine whether the value for the designated attribute of the designated object is stored therein;

responsive to a determination that the value for the designated attribute of the designated object is stored in the result cache, return the value stored in the result cache to the policy; and responsive to a determination that the value for the designated attribute of the designated object is not stored in the result cache, query the target system for the value of the designated attribute of the designated object;

wherein the target system is eDirectory and the query is a DirXML script query.

6. The system of claim 5 wherein the computer-readable media further has stored thereon instructions executable by the computer for causing the system to, responsive to receipt of the value for the designated attribute of the designated object from the target system in response to the querying, store the value in the result cache and returning the value to the policy.

7. The system of claim 5 wherein the computer-readable media further has stored thereon instructions executable by the computer for causing the system to, responsive to a determination that the value for the designated attribute of the designated object is not stored in the result cache, prior to the submitting:
   obtain a list of additional attributes for the designated object requested in previous runs of the policy;
   eliminate from the list additional attributes the values of which are stored in the result cache; and
   query the target system for the value of each of the additional attributes that remain on the list.

8. The system of claim 7 wherein the computer-readable media further has stored thereon instructions executable by the computer for causing the system to, subsequent to the submitting, add the designated attribute of the designated object to the list.

9. A computer-implemented system for efficient issuance of queries by a policy for a value of an attribute of an object of the target system, the system comprising:
   computer-readable media having stored therein instructions executable by the computer for causing the system to:
      responsive to issuance by a policy of a query for a value of a designated attribute of a designated object of a target system, make a determination whether the value for the designated attribute of the designated object is stored therein;
      responsive to a determination that the value for the designated attribute of the designated object is stored in a result cache, return the value stored in the result cache to the policy; and
      responsive to a determination that the value for the designated attribute of the designated object is not stored in the result cache, query the target system for the value of the designated attribute of the designated object;
   wherein the target system is eDirectory and the query is a DirXML script query.

10. The system of claim 9 wherein the computer-readable media further has stored therein instructions executable by the computer for causing the system to, responsive to receipt of the value for the designated attribute of the designated object from the target system in response to the querying, store the value in the result cache and return the value the policy.

11. The system of claim 9 further comprising a prefetcher, wherein responsive to a determination that the value for the designated attribute of the designated object is not stored in the result cache and prior to the submitting, a list of additional attributes for the designated object requested in previous runs of the policy is obtained from the prefetcher; additional attributes the values of which are stored in the result cache are eliminated from the list; and the target system is queried for the value of each of the additional attributes that remain on the list.

12. The system of claim 11 wherein, subsequent to the submitting, the designated attribute of the designated object is added to the list.

* * * * *